Oct. 8, 1963 A. H. BOTT 3,106,711

MULTIPLEX CONTROL SYSTEM

Filed Feb. 2, 1959 4 Sheets-Sheet 1

INVENTOR.
ADOLF H. BOTT
BY George T. Craig
ATTORNEY

Oct. 8, 1963 A. H. BOTT 3,106,711

MULTIPLEX CONTROL SYSTEM

Filed Feb. 2, 1959

4 Sheets-Sheet 2

INVENTOR.
ADOLF H. BOTT
BY George T. Craig
ATTORNEY

INVENTOR.
ADOLF H. BOTT
BY George T. Craig
ATTORNEY

Oct. 8, 1963 A. H. BOTT 3,106,711

MULTIPLEX CONTROL SYSTEM

Filed Feb. 2, 1959

4 Sheets-Sheet 4

INVENTOR.
ADOLF H. BOTT
BY
George T. Craig
ATTORNEY 3,106,711
MULTIPLEX CONTROL SYSTEM
Adolf Hans Bott, Delaware Township, Camden County, N.J., assignor to Radio Corporation of America, a corporation of Delaware
Filed Feb. 2, 1959, Ser. No. 790,433
17 Claims. (Cl. 343—228)

The present invention relates to multiplex control systems, and more particularly to a control system applicable to the control of sub-channel transmission and reception in a frequency modulation multiplex broadcast service.

Broadcast stations providing broadcast service by frequency modulation (FM) have provided special services to subscribers on a fee basis. Initially the service was provided by "simplex" operations which is a system of muting receivers, tuned to a particular broadcast station, by means of supersonic tones to be silent during parts of the transmitted program. Transmitted supersonic tones are also employed at the receiver, not only to eliminate parts of the transmitted program, but, also, to select certain portions of the program for reproduction. Simplex operation is being superseded by a "multiplex" system. The latter is the simultaneous transmission of two or more separate program channels on the same radio frequency (RF) carrier. One program frequency modulates the main RF carrier received on conventional FM broadcast receivers. An additional program, or programs, frequency modulates a subcarrier, or subcarriers. The modulated subcarrier also frequency modulates the main RF carrier. The subcarriers are in the supersonic frequency range.

In the present briefly described multiplex systems, control tones, or a separate subcarrier channel, are employed to provide for selective operation of the receivers of subscribers receiving a special service. The tone control system occupies so much space in the frequency spectrum that only one subcarrier can be utilized. Also, use of a separate sub-channel unluly occupies space in the frequency spectrum. Control action for these known systems is conducted in the frequency domain.

In accordance with the present invention, control action is conducted in the time domain. In practicing the present invention, advantage is taken of the fact that program signal modulation and control action are never present at the same time in one sub-channel. A system in accordance with the present invention employs pulses for control. These pulses, for a particular sub-channel, may be transmitted by pulsed interruption of the subcarrier for that sub-channel, or they may be transmitted by applying the subcarrier for the duration of each pulse. The control pulses may exercise control by pulse spacing in a pulse group. The pulse group may conveniently be a pulse pair. Also, the control function, in accordance with this invention, may employ the suppression of a subcarrier, as by muting at the transmitter, to condition the receiver for operation by later received pulses.

The principal object of the present invention is to provide a novel system for controlling the operation of one or more receivers in a multiplex FM broadcasting service.

Another object of the present invention is to provide a novel system for providing switching information without sacrifice of bandwidth for controlling the operation of one or more remote receivers.

A further object of the present invention is to provide for controlling a remote receiver in a multiplex system by a change or changes in one or more of the subcarriers employed to obtain multiplex operation.

Figure 1:
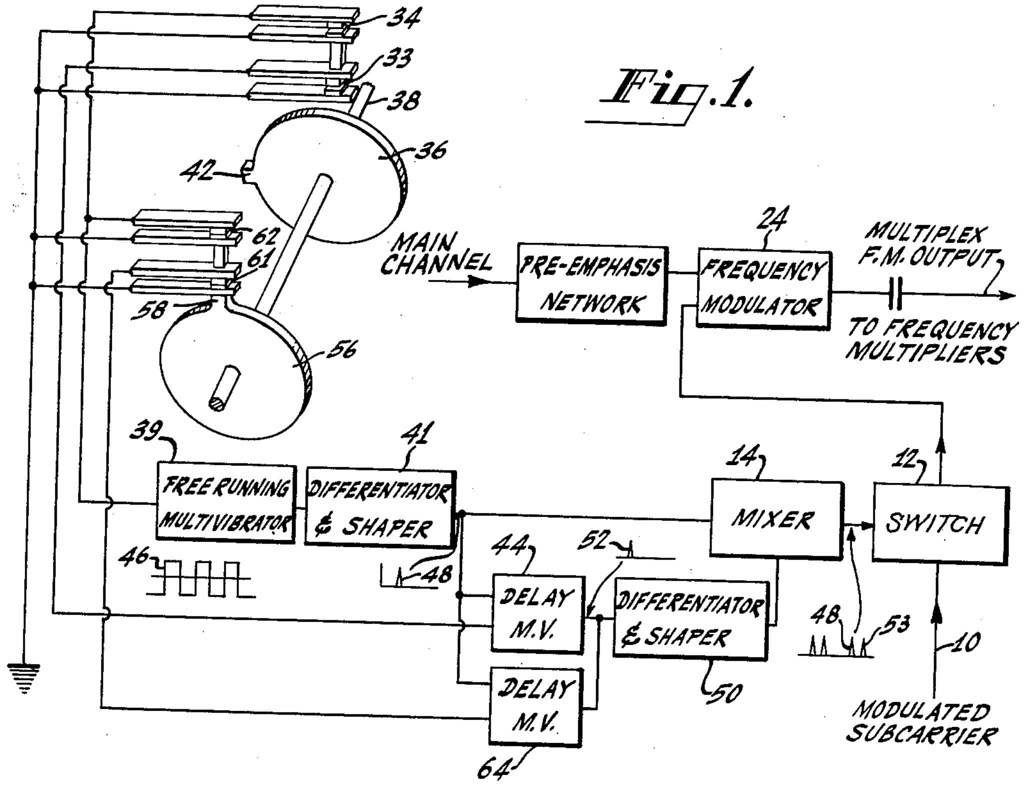
FIG. 1 is a schematic showing of an arrangement in accordance with the present invention for obtaining control signals in a multiplex transmitter.

Referring for the present to FIG. 1 of the drawing, the apparatus shown is located at a transmitter providing a requency modulation multiple service. To provide this service, a frequency modulated subcarrier is produced. The main channel modulator of the transmitter will, for example, operate to provide a signal in the FM broadcast band, which in the United States extends from 88 to 108 megacycles per second (mc./s.). Presently, the maximum frequency deviation is plus and minus 75 kilocycles per second (±75 kc./s.). If one sub-channel is used in a multiplex system, it might be held to 15% modulation, and the main channel would then be held to 85% modulation. If two sub-channels are to be employed, they might be held to 15% modulation each, and the main channel would then be held to 70% modulation. In the stated example, 15% modulation would be a little in excess of ± 11 kc./s. For multiplex purposes, the subcarrier must be supersonic and also below 75 kc./s. As a practical matter, the subcarrier of an FM multiplex system may preferably be in the 32 to 67 kc./s. frequency range. As a typical example, if one sub-channel is combined with the main channel by employing the FM multiplex process, the sub-channel may be a 67-kc. subcarrier which is frequency modulated in accordance with intelligence, such as audio, with a maximum frequency deviation of ±7.5 kc./s. If a second sub-channel is added it may employ a subcarrier frequency of 42 kc./s. modulated by a third audio signal (assuming that the main channel audio signal is the "first" audio signal) with a maximum frequency deviation in the order of ±7.5 kc./s.

Referring again to FIG. 1 of the drawing, the frequency modulated subcarrier appears in the input connection 10 of a switching device designated by reference character 12. The latter may be an amplifier stage which may be biased to cutoff by the output of a pulse signal combiner or mixer 14. It will be understood that there may be, and preferably is, more than one subchannel and, therefore, more than one source of modulated subcarrier.

Figure 2:
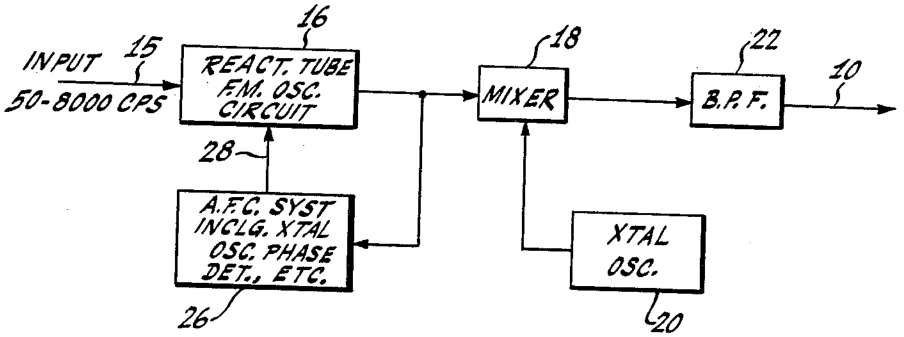
FIG. 2 is a block diagram of an arrangement for producing frequency modulated subcarrier wave.

FIG. 2 of the drawing shows an arangement for producing a frequency modulated subcarrier signal, which may be the second multiplex channel corresponding to the first sub-channel. This second multiplex channel audio input, which may include a range of frequencies extending from 50 to 8000 c.p.s., is applied to the input 15 of a reactance tube frequency modulated oscillator circuit 16. Preferably, a pre-emphasis net-work (not shown) precedes the oscillator circuit 16. The frequency modulated oscillator circuit 16 might operate at a rest or center frequency of 6.1 mc./s., for example, and would be directly frequency modulated in any known manner, as by push-pull reactance tubes similar to the arrangement of Crosby United States Patent No. 2,250,-095, granted July 22, 1941, to provide, for example, a maximum deviation of ± 7.5 kc./s.

The frequency modulated output of circuit 16 is combined in a mixer 18 with the output of a crystal oscillator 20, operating at a frequency of 67 kc./s. above or below 6.1 mc./s., to produce in the output of this mixer a frequency modulated beat frequency wave of 67 kc., with a maximum frequency deviation of ± 7.5 kc./s. This particular beat frequency signal is selected from the output of the mixer 18 by a band pass filter 22, which may pass a band of frequencies extending from 47 to 87 kc./s. The 67-kc. frequency modulated subcarrier appearing at the output of the filter 22 is the frequency modulated subcarrier comprising the second multiplex channel and it is applied to the frequency modulator 24 (FIG. 1).

An automatic frequency control system 26 operates to control the center or average frequency of the oscillator of circuit 16. For frequency control purposes, a sample of the output of the frequency modulated oscillator 16 is fed to the input of the automatic frequency control system 26. In the system 26, the signal is first divided down and compared in a phase detector (not shown in detail) with the output of a crystal stabilized reference frequency oscillator. The phase detector output control voltage, appearing in the connection 28, is applied to control the oscillator in the circuit 16. If the latter is, as suggested above by way of example, a reactance tube modulated oscillator, the control voltage in connection 28 may be applied to the reactance tube.

Referring again to FIG. 1, two sets of contacts 33 and 34 are operated by a cam 36. The cam 36 is secured on a shaft 38 which may be driven from a synchronous clock motor through a suitable time gear train, or from a connection to a tape reproducer (not shown) providing the audio signal input to the connection 15. The shaft 38 may be driven from other sources, such, as for example, a source of cue signals having a timed drive.

Figures 3, 4:
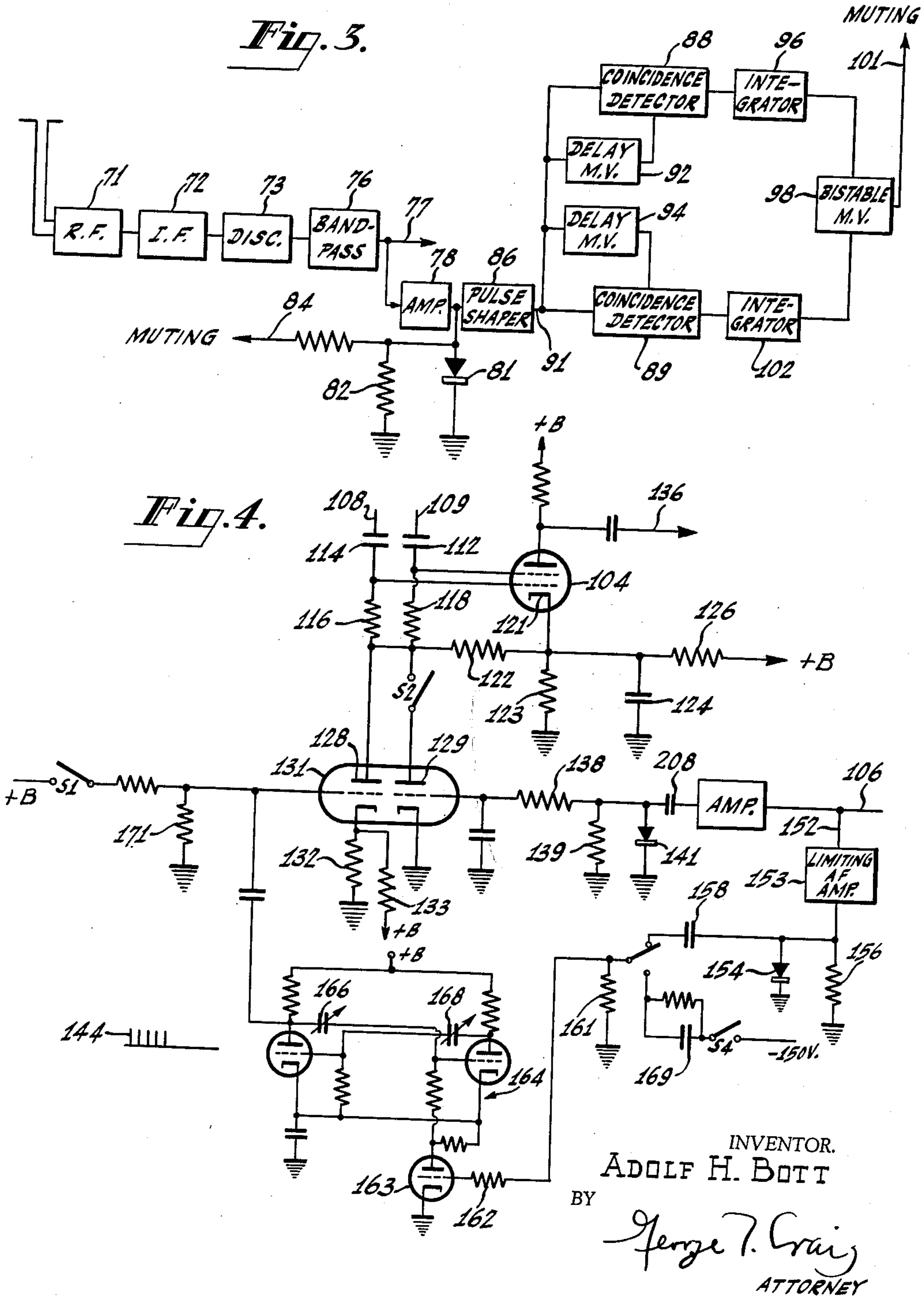
FIG. 3 is a schematic showing of a portion of a receiver arranged to accept and be operated by signals obtained in operation of the apparatus of FIG. 1.
FIG. 4 is a schematic showing of a modified arrangement in accordance with the present invention for obtaining control signals in a multiplex transmitter.

In the sysetm of FIGS. 1 to 3, according to the present invention, spaced pulse pairs are employed to carry switching intelligence for operation of remote receivers in accordance with the selected plan of program reproduction. The initial pulse of each pulse pair is produced by an astable or free-running multivibrator 39 followed by a differentiator and pulse shaper 41. Free-running multivibrators, as well as differentiating circuits, are well known. "Principles of Radar" by Reintjes and Coate, 3rd ed., McGraw-Hill Publishing Co. page 92. The polarity of the multivibrator output and the polarity of the rectifier will provide suppression of the differentiated unwanted sharp pulse and passage of the sharp pulse of desired polarity.

The cam 36, as stated above, will rotate in accordance with the prearranged program timing until the cam projection 42 engages the contact sets 33 and 34. The contact set 33 will close first to remove bias from a delay multivibrator 44. "Principles of Radar" by Reintjes and Coate, 3rd ed., McGraw-Hill Publishing Co., page 99. The latter may be of the single shot or single stroke type. The duration time of the produced pulses is determined by the restoring time of the multivibrator as is well known in the art. Contact set 34 will close next as the cam projection 42 advances to remove bias from the free-running multivibrator 39, thereby to initiate production of a pulse train 46. The differentiator and shaper has polarity such that it selects and transmits the positive-going sharp pulses 48. Also, the negative-going sharp pulses produced as the result of differentiation are or may be inverted and employed so that there is a sharp pulse for each change in direction of polarity of the square wave 46. The delay multivibrator 44, which is rendered operative by closure of the contact pair 33 receives the series of sharp pulses 48 produced by the differentiator and pulse shaper 41. Each sharp pulse 48 triggers the delay multivibrator 44 and it produces a pulse 52 which is preferably of short time duration. The pulse 52 from the delay multivibrator 44 is differentiated in the differentiator and shaper 50 so as ot obtain a pulse output corresponding to the termination of the pulse produced at its output and this sharp pulse 53 constitutes the second sharp pulse of a pulse pair. The pulses 48 and 53 are combined in a mixer 14 of any known type, for example, a matrix or a vacuum tube mixer, and the resulting pulses fed to the switch 12 produce an interruption of the subcarrier for each pulse. Modulation of the subcarrier by each of these pulses will provide a subcarrier interruption on the occurrence of each pulse. The switching device 12 may comprise an amplifier which is cutoff upon occurrence of a pulse 48 or 53.

Additional pulse pairs may be provided by employment of additonal cams similar to the cams 36 and 56. The timing of the switching provided by these cams will, of course, be selected in accordance with program requirements. In the illustrative example of FIG. 1, a second cam 56 is shown, the cam projection 58 of which controls two pairs of switching contacts 61 and 62, respectively. The switching pair 61 conditions a second delay multivibrator 64 for operation. The latter is set to provide a pulse length either greater or less than that of the pulse length provided by the multivibrator 44. As a result of the operation of the multivibrator 64, a second pulse pair is produced having a different pulse spacing between pulses of the pair.

The following arbitrary values for pulse length, pulse pair spacing, pulse pair repetition, and length of time of production of the pulse pairs, are given solely by way of example: The pulse length may be 150 microseconds. The pulse pair spacing may lie between 1 and 10 milliseconds. Thirty pulse pairs may be produced per second. The length of switching time, as determined by the "dwell" of the cams 36, 35 and 56, and others in the mechanical arrangement shown by way of example in FIG. 1 of the drawing may last from ½ to 2 seconds. The pulse pair repetition, as timed by the free-running multivibrator 39, may be provided by differentiation and selection of either the positive or negative-going sharp pulses resulting from the differentiation process. For example, with the pulse frequency of 30 cycles per second, the pulses 48 may represent either the selected positive-going or negative-going sharp pulses. If both the negative-going and positive-going sharp pulses are selected with one set reversed in polarity, then the pulse pair repetition rate is conveniently doubled. For most systems, there will be a separate switch, similar to the switch 12, for the second subcarrier, and a separate set of multivibrators 44 and 64. This arrangement may be duplicated for each subcarrier.

FIG. 3 of the drawing shows, by way of example, a receiver suitable for control by one of the pulse pair modulated subcarriers produced in operation of the arrangement of FIG. 1 of the drawing. The radio frequency (RF) and the intermediate frequency (IF) part of the receiver is or may be conventional. These parts are indicated, respectively, by reference characters 71 and 72. At the first discriminator 73, the main-channel audio modulation and the modulated subcarrier are recovered. Following the bandpass filter 76, only the subcarrier is present. The subcarrier is fed by way of a connection 77 to the sub-channel adapter, which is part of the receiver, having for its function to demodulate the subcarrier to obtain the audio signal, for example, the signal appearing in the connection 15 of FIG. 2. The subcarrier is also fed into a muting amplifier 78 which is part of a conventional multiplex receiver. After amplification, the subcarrier is rectified by an amplitude sensitive rectifier 81 in combination with a rectifier load resistor 82. The D.C. voltage produced by the rectifier 81 is applied over a connection 84 to operate a muting circuit (not shown) which cuts off the audio frequency channel in case of a sub- or maincarrier failure.

At the rectifier 81, the original control pulses of the control system are recovered and fed into a pulse shaper 86. The purpose of the pulse shaper 86 is to obtain pulses of rectangular form. The pulse shaper may be of any known type, such, for example, as a one shot multivibrator similar to the multivibrator 44 or the multivibrator 64 of FIG. 1. The time duration of each pulse recovered from the pulse shaper 86 preferably corresponds to the time duration of the original pulses, thereby to facilitate detection of a particular pulse pair by the coincidence detector 88 or 89. The recovered and shaped pulses are fed over a connection 91 to the previously mentioned coincidence detectors 88 and 89. Assuming that the receiver of FIG. 3 is to be operated by the illustrative example of FIG. 1 of the drawing, one coincidence detector, for example, 88, may be arranged to respond to pulse pairs produced by the differentiator and shaper 41 and the delay multivibrator 44. The other coincidence detector 89 may be arranged to respond to the pulse pair produced by the differentiator and shaper 41 and the delay multivibrator 64. Other coincidence detectors may be included to respond to further pulse pair spacing occurring in the subcarrier selected by the bandpass filter 76. Moreover, where there is more than one sub-channel, the bandpass filter 76 in a particular receiver will pass only the subcarrier needed to provide selection of the desired sub-channel. The arrangement shown in FIG. 1 will, in general, be duplicated for each sub-channel. A delay multivibrator 92 fed from the connection 91 has its output connected to the coincidence detector 88. A second delay multivibrator 94 has its output connected to the coincidence detector 89.

Considering the coincidence detector 88 and its operation, if the delay multivibrator 92 has the same time delay as the multivibrator 44, then a displaced pulse pair will be produced, the first pulse of which coincides with the second pulse fed directly to the coincidence detector 88. Coincidence detectors 88 and 89 may be in the nature of gating tubes. When pulse coincidence occurs, a pulse will be passed to an integrator circuit 96. Voltage built up in the integrator circuit 96 can be employed to operate a bistable multivibrator 98 to switch the receiver audio amplifier on or off by applying a control voltage over connection 101 to the muting or squelch circuit of the receiver. If the integrator 96 serves to turn the receiver off, then a corresponding integrator circuit 102 may be employed to turn the receiver on. The bistable multivibrator 98 is of a well known type discussed in an article entitled "Electronic Digital Counters," by Warren H. Bliss, appearing in the April 1949 issue of Electrical Engineering.

Figures 5, 6:
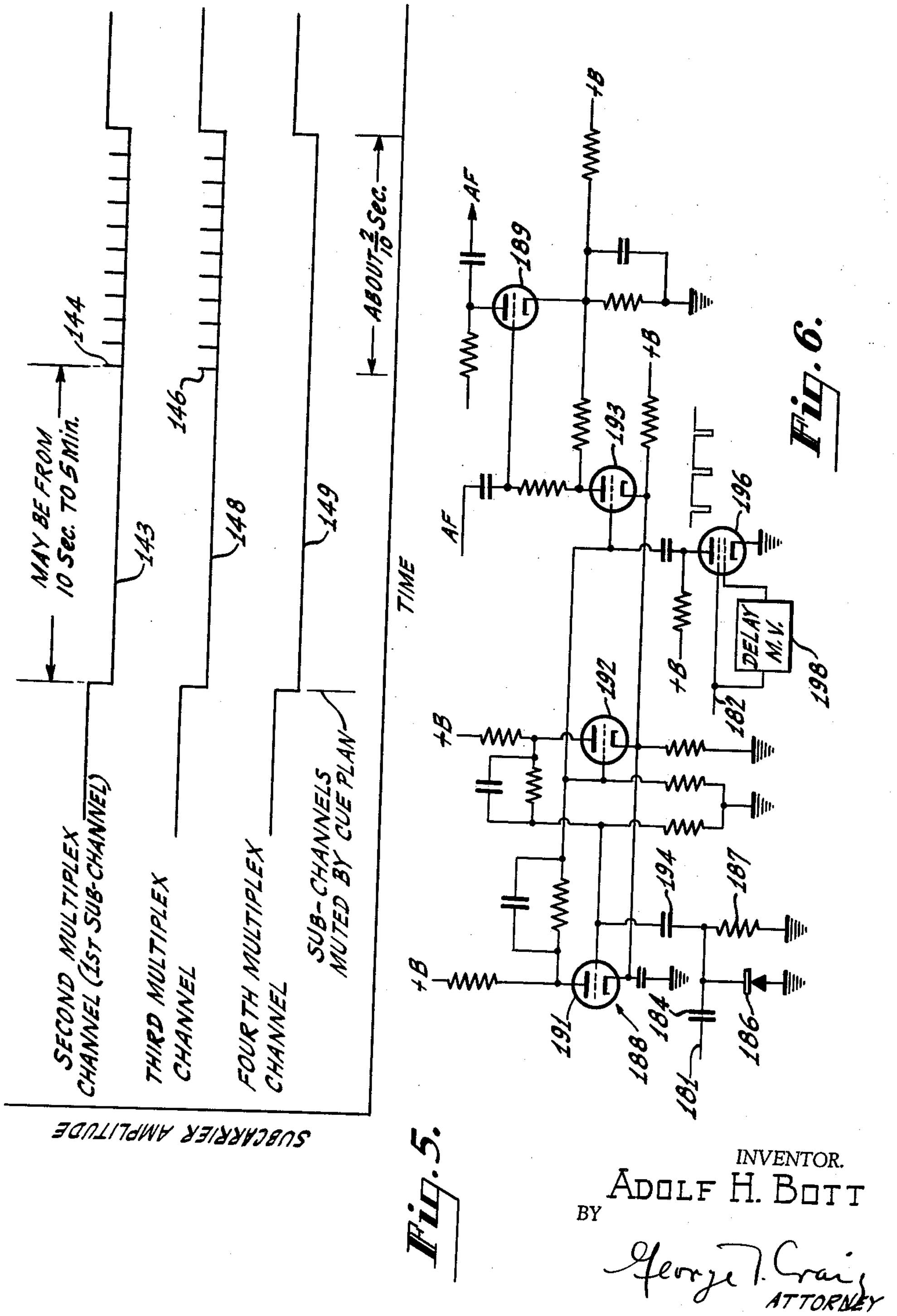
FIG. 5 is a chart indicating, by way of example, the timing of signals in operation of the apparatus of FIG. 3.
FIG. 6 is a schematic showing of a portion of a receiver arranged to accept and be operated by signals obtained in operation of the apparatus of FIG. 3.
Figure 7:
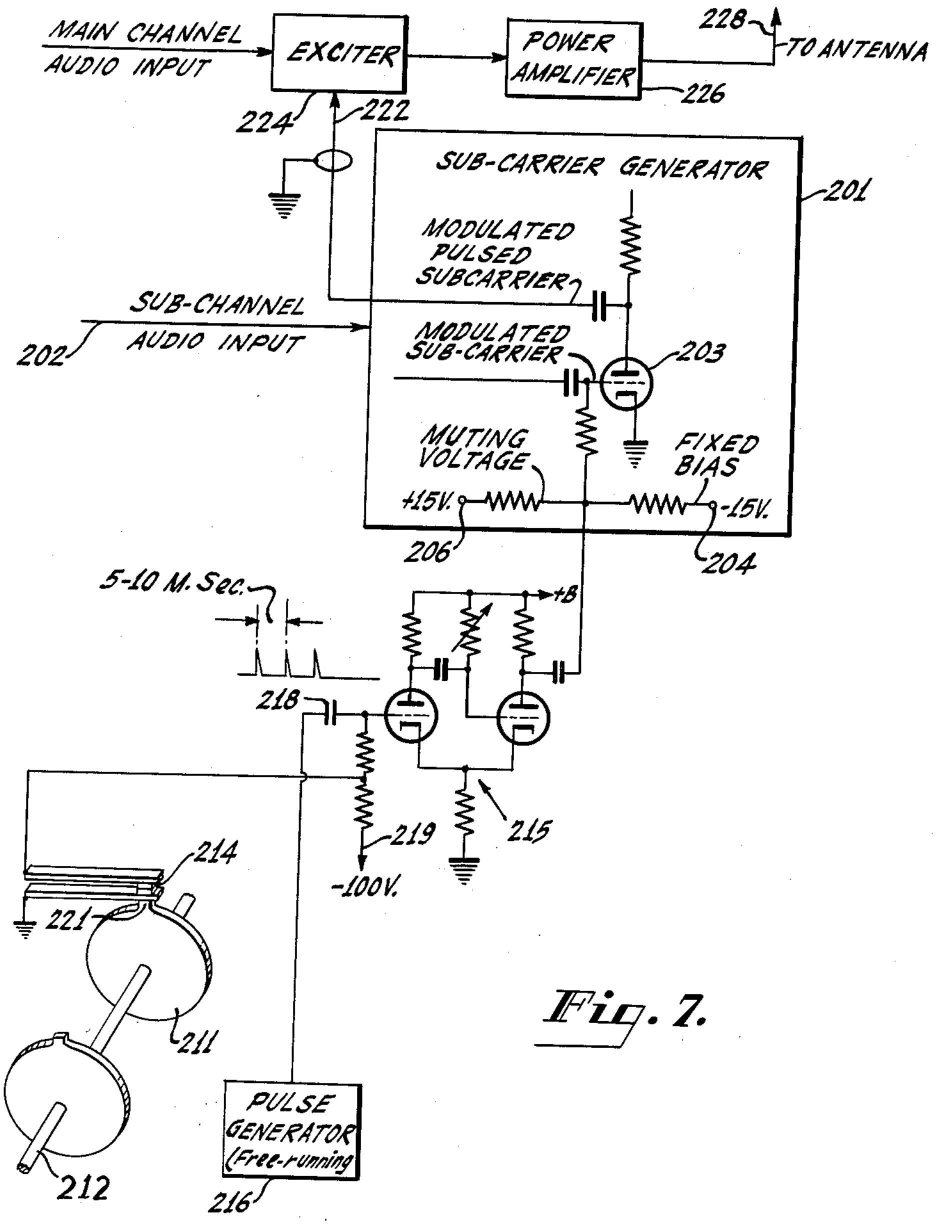
FIG. 7 is a schematic showing of a further modification of transmitter apparatus in accordance with the invention for obtaining control signals.

FIGS. 4 and 6 show, respectively, a transmitter arrangement and a portion of a receiver which operate in accordance with a modification of the present invention. In the arrangement of FIG. 4, the time interval between pulses of the pulse repetition rate of a series of pulses is employed at responding receivers to obtain a switching function at the receiver. The production of the series of time spaced pulses may be controlled by the application of audio frequency modulation to a particular subcarrier of cue signals from a tape playback machine, or the like. A subcarrier will be pulse modulated at appropriate times in accordance with removal and application of intelligence to the subcarrier for modulation purposes. In the arrangement of FIG. 7 of the drawing, a mechanical arrangement similar to that shown in FIG. 1 is employed to control application of pulse modulation to the subcarrier. In the arrangement of FIG. 2, for example, for providing the modulated subcarrier, the mixer 18 is shown in FIG. 4 as being provided with a muting arrangement which serves to cut off the subcarrier when the modulating signal is absent. This arrangement of FIG. 4 switches on the subcarrier briefly at intervals to provide pulse modulation of the subcarrier so that the spaced pulses are transmitted.

Referring more in detail to FIG. 4 of the drawing, an audio frequency signal to be applied for modulating the particular subcarrier heterodyned in the mixer tube 104 is applied to a connection 106. Input to the mixer tube 104 is applied to the connections 108 and 109. These connections correspond to the output from the reactance tube oscillator and the crystal oscillator. The connection 109, which may be from the crystal oscillator, is connected to the No. 3 grid of the tube by way of a coupling capacitor 112. The connection 108, which may be from the reactance tube frequency modulated oscillator, is connected by way of a coupling capacitor 114 to the No. 1 grid. The No. 1 and No. 3 grids are returned, respectively, by resistors 116 and 118 to the cathode 121 by way of a series resistor 122. The cathode 121 is returned to a potential reference point, such as ground, by way of a cathode resistor 123 shunted by a capacitor 124. The cathode 121 is maintained at a positive potential by means of a resistor 126 connected to a source of positive potential so that the resistors 123 and 126 serve as a voltage divider. The resistor 122 is connected to the anodes 128 and 129 of a dual tube structure 131. The cathode of the righthand tube section is returned to ground. The cathode of the lefthand tube section is connected to ground through a cathode resistor 132. The cathode of the lefthand tube section is also connected to a point of positive potential by way of a resistor 133.

Considering the righthand tube section, when it is nonconducting, the mixer tube 104 functions to provide the subcarrier in the tube output connection 136. A switch S2 may be opened to disable the muting arrangement operating under control of the audio frequency signal applied to the connection 106. With the switch S2 closed and with an audio frequency signal applied to the connection 106, the righthand section of the tube structure 131 is not conducting and a subcarrier output appears in the connection 136. With the righthand section of the tube structure 131 conducting, grid potential on the mixer grid is lowered to cut off the mixer and thereby to cut off the subcarrier. Maintenance of transmission of the subcarrier is acomplished by maintaining a negative potential at the junction point of resistors 138 and 139 by a diode 141.

Referring to FIG. 5 of the drawing, and assuming that the signal appearing at the mixer output 136 is the second multiplex channel signal (first sub-channel), it will be seen that the subcarrier is turned off as indicated by the curve 143 of FIG. 5. It can be assumed that all multiplex channels will be muted at a time in accordance with a cuing plan for the service supplied to subscribers of these sub-channels. The interruption period may last from ten seconds to five minutes. During the latter part of the interruption period, for example, for $\frac{2}{10}$ths of a second, pulses of the subcarrier in each of the sub-channels may be generated thereby to provide control signals for operation of subscribers' receivers. The pulses which are transmitted for control purposes may have a relatively long time duration, for example, one millisecond. The significant spacing between the pulses may vary between 5 to 10 milliseconds. For example, the first sub-channel may have pulses 144 of 1 millisecond duration spaced at 5 millisecond intervals and the second sub-channel may have pulses 146 of 1 millisecond duration spaced at 7 millisecond intervals. The curve 148 shows the signal in the third multiplex (second sub-channel) and the curve 149 shows the signal in the fourth multiplex channel.

The second multiplex channel restores any subscriber's receiver identified by the 5 millisecond pulse spacing and also the general group not requiring control, as indicated by the curve 149. The third multiplex channel restores receivers of the 7 millisecond group and alseo the general group of receivers responsive to the fourth multiplex channel. As shown by the curve 149, only the general group of receivers is restored when this subcarrier is resumed and modulated if no pulses are transmitted by modulating the other subcarrier.

Referring again to FIG. 4 of the drawing, the audio frequency signal in the channel 106 also appears in a connection 152 and is amplified by an amplifier 153. The output of amplifier 153 is rectified by a muting signal diode 154 shunted by a diode load resistor 156. This diode 154 functions in the same manner as the previously described diode 141, but it is employed for the purpose of applying the subcarrier pulse signals 144, or 146 or other pulse signals in other multiplex channels if they are to be used.

The output from the muting diode 154 is applied through a capacitor 158 to the junction point of a pair of series-connected resistors 161 and 162. The resistor 161 serves as the grid resistor for a tube 163. The latter is connected effectively in series with one tube of a multivibrator 164. This multivibrator is of a known type and serves to provide a series of pulses, for example, the pulses 144 of FIG. 5. These pulses are, for example, of one millisecond duration occurring at intervals of five milliseconds. Timing of the pulses is accomplished in a known manner by adjustment of capacitors 166 and 168. The length of time during which these pulses are produced is controlled by the time constant of capacitor 158 and the resistor 161. The time of production may also be timed with the time constant of a capacitor 169 and the resistor 161. The capacitor 169 is connected to a switch S4 which provides for manual operation of the multivibrator 164 when desired. When the switch S4 is closed, a negative voltage is applied to the grid of the tube 163 through the series combination of capacitor 169 and resistor 161. The switch S4 is or may be connected to a negative voltage source through a cam operated switch similar to the cam operated contacts 34 of FIG. 1.

If the switch S2 is open so as to disable the automatic muting, then the switch S1 may be used to remove the subcarrier upon closing this switch. The switch S1 controls application of a positive voltage to the grid of the lefthand section of the tube 131. A resistor 171 serves as a grid resistor for this purpose.

FIG. 6 of the drawing discloses a portion of any known type of FM multiplex receiver modified in accordance with the present invention to respond to the type of signal represented by curves 143 or 148 of FIG. 5 of the drawing. The output from the bandpass filter of the receiver corresponding to the filter 76 of FIG. 3 is applied to connections 181 and 182. The subcarrier received by the connection 181 is applied through a capacitor 184 to a diode detector 186 shunted by a load resistor 187.

A bistable multivibrator 188 of a known type serves to control muting of an audio frequency amplifier tube 189 located in the audio frequency channel of the receiver. The multivibrator comprises two cross-connected tubes 191 and 192. When the tube 192 is conducting, the tube 189 is cut off. This is accomplished through a tube 193, the grid of which is connected to the anode of the tube 191. With the tube 191 nonconductive, the grid of tube 193 is positive, causing this tube to conduct to thereby block the tube 189. This muting condition is brought about by a negative-going discharge impulse developed in the muting rectifier 186 when the subcarrier ceases. This impulse is developed with the aid of a coupling capacitor 194 connected to the grid of the tube 191.

The pulses, for example, the pulses 144 of FIG. 5, preceding the resumption of subcarrier, will be checked in a coincidence detector tube 196, and if of proper spacing will reverse the multivibrator 188, thus activating the audio amplifier of the receiver. These pulses appear in the connection 182 and are applied directly to one grid of the tube 196. The pulses are delayed in a delay multivibrator 198 and are applied to another grid of the tube 196. The timing of the delay multivibrator is nearly equal to that of the interval between the pulses, in which case a direct pulse will coincide in time occurrence with a delayed pulse, thereby to provide a pulse for turning off the tube 192. The tube 191 will then conduct. An integrating circuit may be included in the connection between the tube 196 and the multivibrator 188 so that the receiver will not be activated by random pulses. The connection 182 may receive the output from the rectifier 186 or may include a rectifying detector similar to the rectifier 186 and load resistor 187.

FIG. 7 of the drawing shows an arrangement of an FM multiplex transmitter which is somewhat similar to the arrangement shown in FIG. 4 of the drawing. In the simplified showing of FIG. 7, the rectangle 201 represents a subcarrier generator to which an audio frequency signal is supplied by way of the connection 202. The subcarrier generator includes an amplifier tube 203. The subcarrier generator 201 is provided with an automatic muting arrangement (not shown) which may operate in a manner similar to that described in FIG. 4 of the drawing. The grid of the amplifier tube 203 may provide directly for muting, in which case a negative fixed bias is applied to the connection 204. A positive voltage is maintained at the connection 206 so long as an audio signal is applied to the connections 202. Preferably, the arrangement is such that the positive potential is maintained at the connection 206 unless the audio modulation is interrupted for more than an appreciable time, for example, one second. The time constant of a circuit such as that in FIG. 4, including the capacitor 208 and the resistor 139, will provide the necessary time delay. In the illustrative example, the negative bias is indicated as minus 15 volts and the bias applied from the automatic muting arrangement is indicated as plus 15 volts.

A cam 211 is secured to a shaft 212 which is rotated by a mechanism (not shown) which is tied in with the tape play-back machines, for example, the output of which provides the audio signal to the connection 202. The cam rotation is preferably arranged so that the contact pair 214 will close one to three seconds before the audio signal is reapplied to the connection 202, and to open approximately three seconds after the audio signal is applied. A delay multivibrator 215 receives a series of pulses produced by a pulse generator 216. The latter may include a free-running multivibrator and a differentiator circuit and pulse shaper. The output of the pulse generator 216 is applied by way of a coupling capacitor 218 to one of the tubes of the delay multivibrator 215. The grid of this tube of the delay multivibrator is returned to a source of negative biasing voltage (not shown) by way of a connection 219. This bias voltage source prevents operation of the delay multivibrator 215 until the contact pair 214 is closed by the cam projection 221 of the cam 211. During the "dwell" time of the cam 211, the delay multivibrator 215 will produce a series of pulses each of a suitable length, depending upon the multiplex channel for which these pulses are intended, as was explained in more detail in connection with FIG. 5 of the drawing. The amplitude of the pulses is such as to overcome the negative bias supplied at the connection 204, thereby to provide a series of subcarrier modulated pulses.

The output of the amplifier tube 203 in the connection 222, which is continued also as the external connection 222, is applied to the exciter 224. The latter includes an oscillator and frequency modulator and is followed by an output power amplifier 226. The output of the power amplifier 226 is radiated from an antenna 228.

In the foregoing, it will be understood that in the receiver arrangement the connection 101, preferably, will control audio reproduction of the audio signal which is recoverable by demodulation of the subcarrier passed by the bandpass filter 76. The connection 84 is also available to cut off reproduction in the same audio channel. The output following the discriminator 73 in FIG. 3 of the drawing may be used for reproduction of the main program, if desired. The subcarrier, being superaudible will not be heard. Also, the tube 189 will be located in the audio channel receiving the demodulated signal recovered from the subcarrier applied to the connections 181 and 182.

What is claimed is:

1. A radio broadcasting system comprising a frequency modulation radio broadcast transmitter having means for modulating its main carrier wave by first program signals within the audio-frequency range, means for concurrently modulating said carrier wave by a subcarrier of a frequency above audibility, means for modulating said subcarrier by second program signals for reproduction only at predetermined receiving points, means for modulating said subcarrier by pairs of spaced pulse signals during intervals when said second program signals are absent, means at said predetermined receiver points for receiving all of said signals, and means at said predetermined receiving points responsive only to said pairs of spaced pulse signals for controlling reproduction of said second program.

2. A radio broadcasting system comprising a frequency modulation radio broadcast transmitter having means for modulating its main carrier wave by first program signals within the audio-frequency range, means for concurrently modulating said carrier wave by a subcarrier of a frequency above audibility, means for modulating said subcarrier by second program signals for reproduction only at predetermined receiving points, means for modulating said subcarrier by time-spaced pulse signals during intervals when said second program signals are absent, means at said predetermined receiver points for receiving all of said signals, and means at said predetermined receiving points responsive only to said time-spaced pulse signals for controlling reproduction of said second program.

3. A radio broadcasting system comprising a frequency modulation radio broadcast transmitter having means for modulating its main carrier wave by first program signals within the audio-frequency range, means for concurrently modulating said carrier wave by a subcarrier of a frequency above audibility, means for modulating said subcarrier by second program signals for reproduction only at predetermined receiving points, means for interrupting said subcarrier at intervals, means for restoring pulses of said subcarrier to provide pulse signals during said intervals of interruption, means at said predetermined receiver points for receiving all of said signals, means at said predetermined receiver points for recovering said subcarrier, and means responsive to said pulses of subcarrier for controlling reproduction of said second program signals.

4. A radio broadcasting system comprising a frequency modulation radio broadcast transmitter having means for modulating its main carrier wave by first program signals within the audio-frequency range, means for concurrently modulating said carrier wave by a subcarrier of a frequency above audibility, means for modulating said subcarrier by second program signals for reproduction only at predetermined receiving points, means for interrupting said subcarrier at intervals, means for restoring pairs of spaced pulses of said subcarrier to provide pulse signals during said intervals of interruption, means at said predetermined receiver points for receiving all of said signals, means at said predetermined receiver points for recovering said subcarrier, and means responsive to said pairs of spaced pulses of subcarrier for controlling reproduction of said second program signals.

5. A radio broadcasting system comprising a frequency modulation radio broadcast transmitter having means for modulating its main carrier wave by first program signals within the audio-frequency range, means for concurrently modulating said carrier wave by a subcarrier of a frequency above audibility, means for modulating said subcarrier by second program signals for reproduction only at predetermined receiving points, means for interrupting said subcarrier at intervals, means for restoring pulses of said subcarrier to provide time-spaced pulse signals during said intervals of interruption, means at said predetermined receiver points for receiving all of said signals, means at said predetermined receiver points for recovering said subcarrier, and means responsive to said time-spaced pulses of subcarrier for controlling reproduction of said second program signals.

6. In a radio transmitter, a source of frequency modulation signals modulated by a first program, a second source of frequency modulation signals modulated by a second program, means for additionally frequency modulating said first source of frequency modulation signals by said second source of modulated frequency modulation signals, means for discontinuing production of said second source of frequency modulation signals in response to interruption of said second program, means for restoring production of said second source of frequency modulation signals independently of said production discontinuing means, and means comprising a source of time spaced electrical pulses for causing operation of said production restoring means whereby to produce pulses from said second source of frequency modulation signals.

7. In a radio transmitter, a source of frequency modulation signals modulated by a first program, a second source of frequency modulation signals modulated by a second program, means for additionally frequency modulating said first source of frequency modulation signals by said second source of modulated frequency modulation signals, muting means for discontinuing production of said second source of frequency modulation signals in response to interruption of said second program, means for restoring production of said second source of frequency modulation signals, a multivibrator for generating time spaced electrical pulses, and means coupling said multivibrator to said means for restoring production of said second source of frequency modulation signals whereby to produce pulses from said second source of frequency modulation signals.

8. In a radio transmitter, a frequency modulated subcarrier source, a main frequency modulator, means to apply the subcarrier from said source to said modulator including a switching device, a free-running multivibrator providing a square waveform of predetermined frequency, a differentiator and shaper coupled to said free-running multivibrator, a delay multivibrator coupled to said differentiator and shaper, a program activated cam operated switch comprising two sets of contacts, means whereby one of said sets of contacts controls operation of said free-running multivibrator, means whereby another of said sets of contacts controls operation of said delay multivibrator prior to operation of said free-running multivibrator, a second differentiator and shaper coupled to said delay multivibrator, a mixer, means coupling said first differentiator and shaper to said mixer, means coupling said second differentiator and shaper to said mixer, and means coupling said switching device to said mixer.

9. In apparatus for supplying other services in a multiplex system, a main carrier wave generator and a modulator therefor excited by voltages or currents representing voice frequency signals and also modulated by a subcarrier which per se is modulated by other voltages or currents representing voice frequency signals, means for periodically modulating said so modulated main carrier by short pulses spaced apart by predetermined time intervals and receiving means including a demodulator, a filter and a pulse shaper connected in cascade in the order given, for producing for control purposes pulses representing said first-named pulses.

10. Apparatus as recited in claim 9 wherein said means is apparatus for modulating said subcarrier used to modulate said main carrier.

11. Apparatus as recited in claim 9 wherein said means interrupts said subcarrier used to modulate said main carrier.

12. Apparatus as recited in claim 9 wherein said means modulates said subcarrier 100%.

13. Apparatus as recited in claim 9 wherein at least one of said modulators is a frequency modulator.

14. Apparatus as recited in claim 9 wherein both of said modulators are frequency modulators.

15. A radio receiver responsive to a frequency modulated carrier and having a frequency modulation carrier demodulator, a filter coupled to the output of said demodulator to recover a subcarrier, a detector coupled to said filter to provide a pulse output corresponding to pulses having a predetermined time spacing and of a given polarity of said recovered subcarrier, a switching device for providing a muting signal for said receiver, and means comprising a coincidence detector operable in response to the time spacing of said pulse output to operate said switching device.

16. A radio receiver responsive to a frequency modulated carrier and having a frequency modulation carrier demodulator, a filter coupled to the output of said demodulator to recover a subcarrier, said subcarrier having recurring pulses during a period of relatively prolonged cessation, a bistable multivibrator, an audio frequency amplifier, means responsive to one state of conduction of said multivibrator for biasing said audio frequency amplifier to cutoff, a detector coupled to the output of said filter, said detector providing an impulse upon cessation of said subcarrier to shift said multivibrator to said one state of conduction, a coincidence detector comprising a tube having a cathode, an anode and at least two grids, means to apply said recovered subcarrier to one of said grids whereby said grid receives pulses of said subcarrier, a pulse delay device having a delay time corresponding to the time spacing of said recurring pulses, means to apply said subcarrier to said pulse delay device, means connecting said pulse delay device to another of said grids, and means to couple said anode of said coincidence detector tube to said multivibrator to shift said multivibrator to a second state of conduction whereby said audio amplifier is biased for operation.

17. A radio receiver responsive to a frequency modulated carrier and having a frequency modulation carrier demodulator, a filter coupled to the output of said demodulator to recover a subcarrier, said subcarrier having recurring pulses during a period of relatively prolonged cessation, a bistable multivibrator, an audio frequency amplifier stage, a vacuum tube means responsive to one state of conduction of said multivibrator for biasing said audio frequency amplifier to cutoff, a detector coupled to the output of said filter, said detector providing an impulse upon cessation of said subcarrier to shift said multivibrator to said one state of conduction, a coincidence detector comprising a tube having a cathode, an anode and at least two grids, means to apply said recovered subcarrier to one of said grids whereby said grid receives pulses of said subcarrier, a pulse delay device having a delay time corresponding to the time spacing of said recurring pulses, means to apply said subcarrier to said pulse delay device, means connecting said pulse delay device to another of said grids, and means to couple said anode of said coincidence detector tube to said multivibrator to shift said multivibrator to a second state of conduction whereby said audio amplifier is biased for operation.

References Cited in the file of this patent

UNITED STATES PATENTS

| | | |
|---|---|---|
| 1,814,956 | Ohl | July 14, 1939 |
| 2,280,421 | Chappell et al. | Apr. 21, 1942 |
| 2,410,276 | Eilenberger | Oct. 29, 1946 |
| 2,462,100 | Hollabaugh | Feb. 22, 1949 |
| 2,512,530 | O'Brien et al. | June 20, 1950 |
| 2,645,771 | Labin | July 14, 1953 |
| 2,709,218 | Gabrilovitch | Mar. 24, 1955 |
| 2,709,254 | Halstead | May 24, 1955 |
| 2,875,270 | Wendt et al. | Feb. 24, 1959 |